US011159587B1

(12) United States Patent
Hao

(10) Patent No.: US 11,159,587 B1
(45) Date of Patent: Oct. 26, 2021

(54) DEVICE AND METHOD FOR CALL FORWARDING BASED ON IMS

(71) Applicant: Ankang Hongtian Science&Techonology Incorporated Company, Shaanxi (CN)

(72) Inventor: Lihong Hao, Shaanxi (CN)

(73) Assignee: Ankang Hongtian Science & Techonology Incorporated Company, Ankang (CN)

( * ) Notice: Subject to any disclaimer, the term of this patent is extended or adjusted under 35 U.S.C. 154(b) by 0 days.

(21) Appl. No.: 16/953,328

(22) Filed: Nov. 20, 2020

(30) Foreign Application Priority Data

Sep. 11, 2020 (CN) .......................... 202010950501.1

(51) Int. Cl.
*H04N 7/14* (2006.01)
*H04M 3/54* (2006.01)
*H04W 4/16* (2009.01)
*H04L 29/06* (2006.01)

(52) U.S. Cl.
CPC ...... *H04L 65/1096* (2013.01); *H04L 65/1006* (2013.01); *H04L 65/1016* (2013.01); *H04M 3/54* (2013.01); *H04N 7/147* (2013.01); *H04W 4/16* (2013.01)

(58) Field of Classification Search
USPC .................................................... 379/211.02
See application file for complete search history.

(56) References Cited

U.S. PATENT DOCUMENTS

| | | | | |
|---|---|---|---|---|
| 2005/0129003 | A1* | 6/2005 | Baeder | H04Q 3/005 370/352 |
| 2007/0286391 | A1* | 12/2007 | Gibson | H04M 3/42161 379/211.02 |
| 2019/0349209 | A1* | 11/2019 | Badar | H04L 12/1403 |

FOREIGN PATENT DOCUMENTS

| | | |
|---|---|---|
| CN | 102238500 A | 11/2011 |
| CN | 102752263 A | 10/2012 |
| CN | 103841528 A | 6/2014 |

* cited by examiner

*Primary Examiner* — Amal S Zenati

(57) ABSTRACT

A call forwarding device based on an IMS includes a terminal and an IMS communication system connected to the terminal. The IMS communication system is respectively connected to an IMS special service number device, an IMS user database and an IMS maintenance device. After the terminal establishes a communication with the IMS special service number device, a forwarding condition and a forwarding number set through an IVR, and a calling number and a called number of the terminal are saved in the IMS user database. When the calling number of the terminal dials the called number, the IMS communication system detects a status of the called number, and a communication is established between the calling number and the forwarding number of the terminal according to the forwarding condition.

6 Claims, 1 Drawing Sheet

DEVICE AND METHOD FOR CALL FORWARDING BASED ON IMS

CROSS-REFERENCE TO RELATED APPLICATIONS

This application claims the benefit of priority from Chinese Patent Application No. 202010950501.1, filed on Sep. 11, 2020. The content of the aforementioned application, including any intervening amendments thereto, is incorporated herein by reference in its entirety.

TECHNICAL FIELD

This application relates to network communication, and more particularly to a device and a method for call forwarding based on an IP (Internet Protocol) Multimedia Subsystem (IMS).

BACKGROUND

Call forwarding is widely adopted to ensure safe communication in daily life. At present, there are two call forwarding specifications. One specification is call forwarding for fixed communication which is based on the program-controlled exchange technology. The specification of the call forwarding for the fixed communications has the following functions. The first function is call forwarding always which can immediately forward all incoming calls to a preset fixed phone or other communication tools. The call forwarding always is often enabled by dialing "*57* followed by the phone number to which incoming calls should be forwarded, and is disabled by dialing "#57#" on the fixed phone. The second function is call forwarding busy. When a third party dials a subscriber that is busy, the call is forwarded to a preset fixed number or other communication tools. The call forwarding busy is often enabled by dialing "*40*" followed by the phone number to which the incoming calls should be forwarded, and is disabled by dialing "#40#" on the fixed phone. When the call forwarding is not activated when the call is not answered, the rejection of the call will be also considered as the call forwarding busy. The third function is call forwarding no answer. When the incoming call is connected but is not answered, the incoming call will be forwarded. Generally, the call forwarding no answer happens when the phone rings more than 6 times. The call forwarding no answer is enabled by pressing "*41*" followed by the phone number to which the incoming calls should be forwarded, and is disabled by pressing "#41#" on the fixed phone.

The other specification is the call forwarding for mobile communication. The call forwarding for mobile communication is realized through terminal command interaction, and has the additional function of call forward unreachable compared to the call forwarding for fixed communication. Specifically, the call forwarding for mobile communication has the following functions. The first function is call forwarding unconditional, in which all incoming calls can be forwarded. The forwarding number is inputted in the terminal to enable this function, and off is clicked to disable this function. The second function is call forwarding busy, in which the new call during the communication is forwarded. The forwarding number is inputted in the terminal to enable this function, and off is clicked to disable this function. The third function is call forwarding no answer, in which the incoming call is forwarded when it is not answered within the set period. The forwarding number is inputted in the terminal to enable this function, and off is clicked to disable this function. The fourth function is call forwarding unreachable. That is, when the mobile phone is turned off or has no signal, or the incoming call is not answered, the incoming calls can be forwarded to other phones, which greatly enhances the safety and convenience of the communication. The forwarding number is inputted in the terminal to enable this function, and off is clicked to disable this function.

With the withdrawal of program-controlled exchange from the network, the existing fixed communication is gradually transitioning to IMS, which is realized through a combination of IMS and Integrated Access Device (IAD). However, when the wired network fails, the fixed phone connected to the IAD and the IP phone connected to the wired network are not capable of forwarding calls to other designated numbers; and when the wired network is recovered, the call forwarding is deactivated. This causes inconvenience and danger of the communication. In addition, only voice forwarding can be achieved in both the fixed communication and the mobile communication, and messages, videos and voices cannot be forwarded simultaneously. Therefore, it is urgent to realize offline and full-service call forwarding, so as to meet the requirements of safe, reliable and real-time communication in daily life.

SUMMARY OF THE DISCLOSURE

The present disclosure aims to provide a device and a method for call forwarding based on an IMS, so as to overcome the problems that offline call forwarding is not available in the fixed network, and the call forwarding method cannot be applied for both the wireless communication and the fixed communication.

Provided is a call forwarding device based on an IMS, comprising:

a terminal, and an IMS communication system connected to the terminal;

wherein the IMS communication system is respectively connected to an IMS special service number device, an IMS user database and an IMS maintenance device;

the terminal communicates with the IMS communication system through a wired network or a wireless network; after the terminal establishes a communication with the IMS special service number device, a forwarding condition and a forwarding number set through an Interactive Voice Response (IVR), and a calling number and a called number of the terminal are saved in the IMS user database;

the IMS communication system allocates Session Initiation Protocol (SIP) accounts for the terminal, and a communication is established among the SIP accounts; wherein the SIP accounts comprise a calling number and a called number of the terminal, and a forwarding number set by the called number;

when the calling number of the terminal dials the called number, the IMS communication system detects a status of the called number, and a communication is established between the calling number and the forwarding number of the terminal according to the forwarding condition set by the called number; wherein the communication comprises a voice communication, a video communication or a message communication;

the terminal comprises an Internet Protocol (IP) videophone, an electronic device installed with a Session Initiation Protocol (SIP) client, and an Integrated Access Device (IAD) adaptable to a digital phone; and the IP videophone, the electronic device and the IAD are connected to the IMS communication system through the wired network; and the terminal further comprises a Voice over Long-Term Evolution (VoLTE)/Voice over New Radio (VoNR) mobile terminal and an electronic device installed with the SIP client; and the VoLTE/VoNR mobile terminal and the electronic device are connected to the IMS communication system through the wireless network.

In some embodiments, the IP videophone, the electronic device installed with the SIP client, and the IAD are respectively connected to the wired network through an IP network.

The present disclosure further provides a method for call forwarding using the call forwarding device, comprising:

1) dialing a special service number through the terminal to allow the terminal to communicate with the IMS special service number device; and broadcasting a voice navigation prompt for setting call forwarding;

2) based on the voice navigation prompt, performing settings or cancellation of the call forwarding through DTMF on the terminal;

3) saving the settings of the call forwarding in the IMS user database to make them effective;

4) allocating the SIP accounts to the terminal connected to the IMS communication system, and establishing a communication among the SIP accounts of the terminal; wherein the SIP accounts of the terminal comprise the calling number and the called number of the terminal and the forwarding number set by the terminal; and 5) when a user dials the called number through the calling number of the terminal, allowing the IMS communication system to detect a status of the called number, and establishing a communication between the calling number of the terminal and the forwarding number according to the forwarding condition and the forwarding number set by the called number; wherein the communication comprises a voice communication, a video communication or the message communication.

In some embodiments, the settings of the call forwarding comprise offline call forwarding, busy call forwarding, unanswered call forwarding, unconditional call forwarding, ringing duration for unanswered call forwarding, time for unconditional call forwarding, and querying of the status of the called number.

In some embodiments, when the IMS communication system detects that the called number is offline, and the call forwarding is activated, the calling number of the terminal establishes the communication with the forwarding number.

In some embodiments, when the IMS communication system detects that the called number is online, and the call forwarding is activated, the calling number of the terminal establishes the communication with the forwarding number.

In some embodiments, when the IMS communication system detects that the called number is online, and the call forwarding is not activated, the calling number of the terminal establishes the communication with the called number.

Compared to the prior art, the present invention has the following beneficial effects.

The call forwarding device of the present invention includes the terminal and the IMS communication system connected thereto. The IMS communication system is respectively connected to the IMS special services number device, the IMS maintenance device and the IMS user database. The terminal is connected to the IMS through the wired network or the wireless network, so that the terminal and the IMS communication system are communicated with each other. After the terminal and the IMS special service number device establish a communication, the forwarding conditions and the forwarding number set by the IVR, and the calling number and the called number of the terminal are saved in the IMS user database. The IMS allocates the SIP accounts for the terminal, and communications are established among the SIP accounts of the terminal.

When the calling number of the terminal dials the called number, the IMS communication system detects the status of the called number, and simultaneously establishes a communication between the calling number and the called number according to the forwarding conditions and forwarding number set by the called number. The communication includes the voice communication, the video communication or the message communication. The method overcomes the problem that offline call forwarding is not available in the fixed network, and the call forwarding method of the present disclosure can be applied for both the wireless communication and the fixed communication. In addition, messages and videos can be forwarded through the method of the present disclosure. The call forwarding method of the present disclosure can realize the call forwarding of the terminal when the terminal is communicated with the IMS communication system. The voice navigation prompt is introduced through the IMS special service number to enable or disable the call forwarding, which effectively unifies the specification of the call forwarding in mobile network and fixed network.

Based on the device and the method of the present disclosure, the video communication and the message communication can be forwarded together with the voice communication. That is, the terminal number of the terminal can establish voice communication with the set forwarding number, and at the same time, the terminal number of the terminal and the set forwarding number can establish the video communication and the message communication. The call forwarding performed by the IMS communication system effectively realizes the full-service call forwarding including voice forwarding, video forwarding and message forwarding, which ensures the safety of real-time communication in multiple scenarios, thereby greatly enhancing the communication efficiency.

DETAILED DESCRIPTION OF EMBODIMENTS

The present disclosure is further illustrated with reference to the accompanying drawings, which is not intended to limit the scope of the present disclosure.

Figure 1:
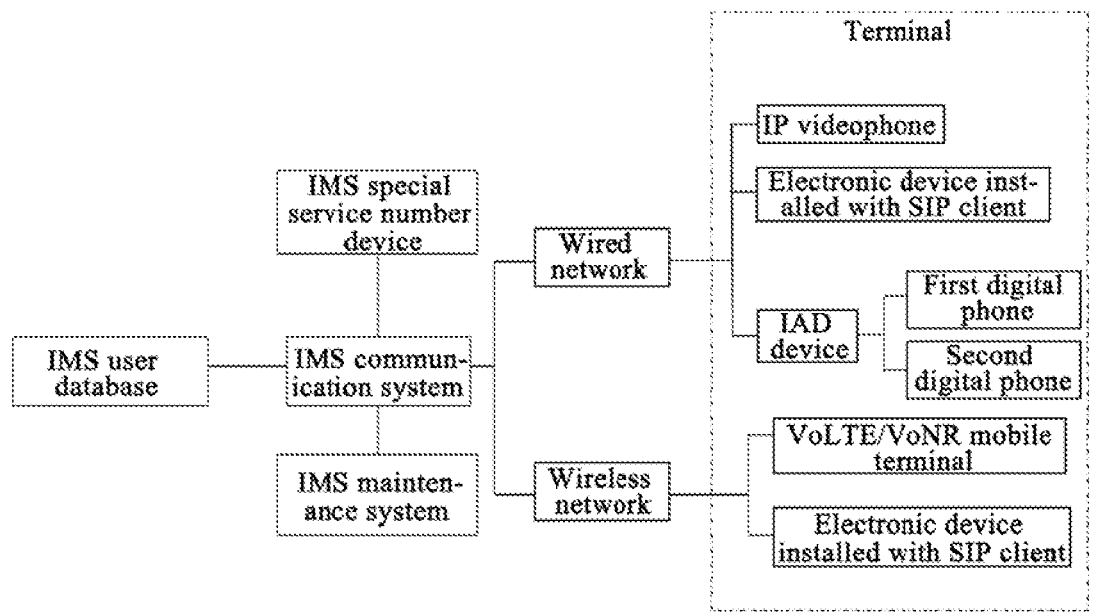
FIG. 1 is schematic diagram of a call forwarding device based on an IMS according to an embodiment of the present disclosure.
Figure 2:
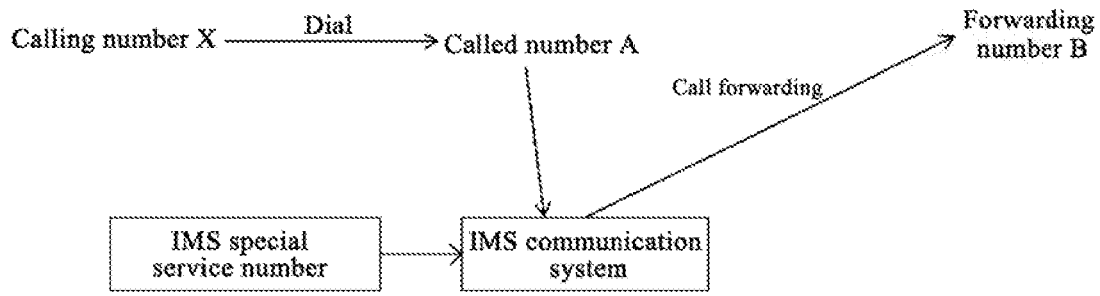
FIG. 2 shows the communication among a calling number and a called number of a terminal and a forwarding number according to an embodiment of the present disclosure.

As shown in FIGS. 1 and 2, this embodiment provides a call forwarding device based on Internet Protocol (IP) Multimedia Subsystem (IMS), including a terminal and an IMS communication system connected to the terminal. The IMS communication system is respectively connected to an IMS special service number device, an IMS user database, and an IMS maintenance device.

The terminal accesses and communicates with the IMS communication system through a wired network or a wireless network. After the terminal establishes communication with the IMS special service number device, a forwarding condition and a forwarding number set through the Interactive Voice Response (IVR), the calling number and the called number of the terminal are all stored in the IMS user database.

The IMS communication system allocates Session Initiation Protocol (SIP) accounts to the terminal, and communications are established among the SIP accounts. The SIP accounts of the terminal include the calling number, the called number and the set forwarding number.

When the calling number of the terminal dials the called number, the IMS communication system detects the status of the called number, and at the same time, establishes a communication between the calling number and the forwarding number of the terminal according to the call forwarding conditions and the forwarding number set by the called number. The communication includes a voice communication, a video communication or a message communication.

The terminal includes an Internet Protocol (IP) videophone connected to the IMS communication system through the wired network, an electronic device installed with a SIP client, and an Integrated Access Device (IAD) that is adaptable to a digital phone.

The terminal also includes a Voice over Long-Term Evolution (VoLTE)/Voice over New Radio (VoNR) mobile terminal connected to the IMS communication terminal through the wireless network and an electronic device installed with a SIP client.

Specifically, the IMS communication system allocates the SIP accounts to the terminal connected to the IMS communication system, and communications are established among the SIP accounts. The SIP accounts of the terminal include the calling number, the called number of the terminal and the set forwarding number. The SIP accounts of the terminal are registered in the IMS communication system through the SIP protocol and saved in the IMS user database. When the calling number of the terminal dials the called number, the IMS communication system detects the registration status of the called number, and at the same time establishes the communication between the calling number of the terminal and the forwarding number according to the forwarding condition and the forwarding number set by the called number. The communication includes the voice communication, the video communication or the message communication. Therefore, full-service call forwarding including the voice forwarding, the video forwarding and the message forwarding can be realized through the IMS communication system.

Specifically, the mobile terminal is a VoLTE/VoNR mobile terminal, and the electronic device installed with the SIP client is a client that supports the SIP communication or a web client. The digital phone is a digital phone with an RJ11 interface, and there are multiple digital phones that are respectively connected to the IAD through lines.

The IMS is based on the $3^{rd}$ Generation Partnership Project (3GPP) Release 5 and is a general network structure that provides multimedia services on the IP network. Due to its multimedia communication capacity, the IMS has become the basis of evolution of fixed and mobile networks and a technology standard of a new generation of network communication, so there will be demands for a universal multimedia intercommunication in practical applications.

The terminal is connected to the IMS communication system through the wired network or the wireless network. Similar to the mobile communication devices, the fixed communication devices (including the IAD of ordinary phones and IP phones) cannot realize the call forwarding when the user is unreachable. Based on the call forwarding, the fixed phones (including the ordinary phones connected to the IAD and the IP phones) automatically send the incoming calls of the fixed phones to the predetermined number when the wired network fails, and automatically disable the call forwarding when the wired network begins to work again. The call forwarding can ensure the safety of the communication of fixed terminals in practical use during emergency conditions. In view of this, the present disclosure provides a device and a method for call forwarding based on the IMS. When call forwarding of an SIP number A is enabled, calls are forwarded to another SIP number B according to the method for call forwarding using the device of the present disclosure, i.e., when the SIP number X calls the SIP number A, the communication is established between the SIP number X and the SIP number B, where the communication includes the voice communication, the video communication or the message communication initiated by the SIP number X. Therefore, both the mobile terminal and the fixed terminal can realize full-service call forwarding through the wired network and the wireless network as long as they can be connected to the IMS communication system.

In some embodiments, the IP videophone, the electronic device installed with the SIP client, and the IAD device that is adaptable to the digital phone are all connected to the wired network through the IP network.

The present disclosure further provides a method for call forwarding using the above-mentioned device, including the following steps.

1) A user dials the IMS special service number through the terminal to allow the terminal to connect the IMS special service number device; and a voice navigation prompt set for the call forwarding is broadcast to the user.

2) The user performs settings or cancellation of the call forwarding on the terminal through Dual Tone Multi-Frequency (DTMF) according to the voice navigation prompt.

3) The settings of the call forwarding are saved into the IMS user database.

4) The terminal connected to the IMS communication system is allocated with SIP accounts, and communications are established among the SIP accounts of the terminal, where the SIP accounts of the terminal include the calling number, the called number of the terminal and a forwarding number set by the called number.

5) When the user dials the called number using the calling number of the terminal, the IMS communication system detects a status of the called number, and the calling number of the terminal establishes a communication with the forwarding number according to forwarding conditions, where the communication includes the voice communication, the video communication or the message communication.

For example, the IMS special service number is 9010000, and the number 9010000 is dialed to communicate with the terminal connected to the IMS communication system. When the special service number 9010000 is answered, the voice navigation prompt IVR is automatically broadcast, and the user performs the settings or cancellations of the call forwarding of the terminal through the DTMF according to the voice navigation prompt. The forwarding conditions and the forwarding number set through the voice navigation prompt IVR, and the calling number and the called number of the terminal are saved in the IMS user database.

The voice navigation prompt of the IMS and corresponding forwarding settings are as follows.

The voice navigation prompt: "please enter "1" to enable the call forwarding, or enter "#" to disable the call forwarding", where the call forwarding function of the terminal is canceled by entering "#"; if "1" is entered, the following prompt will be broadcast.

"Please enter "1" to activate the offline call forwarding, followed by inputting the number to which you want incoming calls to be forwarded and enter "#" to end."

"Please enter "2" to activate the busy call forwarding, followed by inputting the number to which you want incoming calls to be forwarded and enter "#" to end."

"Please enter "3" to activate the no answer call forwarding, followed by inputting the number to which you want incoming calls to be forwarded and enter "#" to end."

"Please enter "4" to activate the unconditional call forwarding, followed by inputting the number to which you want incoming calls to be forwarded and enter "#" to end."

"Please enter "5" to set a ring period before the call is forwarded for the no answer call forwarding, followed by inputting the ring period and enter "#" to end."

"Please enter "6" to set time for the unconditional call forwarding, followed by inputting a start time and an end time and enter "#" to end."

"Please enter "7" to query the status of the call forwarding". Then the status of the call forwarding of the terminal number and the forwarded number is broadcast.

"Please enter "9" to return to the previous menu."

Specifically, the user sets or cancels the call forwarding through DTMF according to the voice navigation prompt, and the forwarding conditions and the forwarding number set by the voice navigation prompt IVR, and the calling number and the called number of the IMS are saved in the IMS user database to take effect. The call forwarding is handled by the IMS communication system. When the user dials the called number through the calling number of the terminal, the IMS communication system detects the status of the called number, and establishes the communication between the calling number of the terminal and the forwarding number according to the forwarding conditions set by the called number. The communication includes the voice communication, the video communication or the message communication. In addition, system maintenance personnel can log in to the IMS through the IMS maintenance device to view the detailed status and information of the call forwarding of the user accounts.

When the call forwarding is activated, the voice communication, the video communication and the message communication can be simultaneously realized. For example, in the case that the called number A assigns B as the forwarding number when the user is unreachable, when the called number A is offline or not in the service area, other numbers dialing the called number A will be automatically forwarded to the assigned forwarding number B. The numbers dialing the called number A can establish the voice communication, and video communication and message communication can be automatically realized, which overcomes the problem that the videos and messages cannot be forwarded.

FIG. 2 shows communications among the calling number and the called number of the terminal and the forwarding number. When the calling number X of the terminal dials the called number A to establish a video communication (the terminal device of the called number A is an SIP terminal in a wired network environment, and the called number A is set to activate the call forwarding when it is offline). The calling number X establishes the communication with the terminal account of the IMS communication system. When the wired network fails, the called number A in the IMS communication system is offline, and the IMS communication system detects that the called number shows 404 according to the SIP protocol response code rules. In addition, the called number A has activated the call forwarding. Therefore, the call initiated by the calling number X is automatically forwarded to the forwarding number B set by the called number A, and the calling number X establishes the video communication with the forwarding number B after the forwarding number B is answered. When the wired network is restored, the IMS communication system detects that the status of the called number A is 100 according to the SIP protocol response code rules, and the offline call forwarding is automatically disabled. After the called number A is answered, the calling number X establishes the video communication with the called number A.

In some embodiments, the settings of the call forwarding include offline forwarding, busy forwarding, no answer forwarding, unconditional forwarding, ringing duration for the no answer call forwarding, time for the unconditional call forwarding, and querying of the status of the called number.

Further, if the IMS communication system detects that the called number is offline, and the call forwarding is enabled, the calling number of the terminal establishes a communication with the forwarding number.

Further, if the IMS communication system detects that the called number is online, and the call forwarding is enabled, the calling number of the terminal establishes a communication with the forwarding number.

Further, if the IMS communication system detects that the called number is online, and the call forwarding is disabled, the calling number of the terminal establishes a communication with the called number.

The call forwarding device of the present disclosure includes the terminal and the IMS communication system connected thereto. The IMS communication system is respectively connected to the IMS special services number device, the IMS maintenance device and the IMS user database. The terminal is connected to the IMS through the wired network or the wireless network, so that the terminal and the IMS communication system are communicated with each other. After the terminal and the IMS special service number device establish a communication, the forwarding conditions and the forwarding number set by the IVR, and the calling number and the called number of the terminal are stored in the IMS user database. The IMS allocates the SIP accounts for the terminal, and communications are established among the SIP accounts of the terminal.

When the calling number of the terminal dials the called number, the IMS communication system detects the status of the called number, and simultaneously establishes a communication between the calling number and the called number according to the forwarding conditions and forwarding number set by the called number. The communication includes the voice communication, the video communication or the message communication. The method overcomes the problem that offline call forwarding is not available in the fixed network, and the call forwarding method of the present disclosure can be applied for both the wireless communication and the fixed communication. In addition, messages and videos can be forwarded through the method of the present disclosure. The call forwarding method of the present disclosure can realize the call forwarding of the terminal when the terminal is communicated with the IMS communication system. The voice navigation prompt is introduced through the IMS special service number to enable or disable the call forwarding, which effectively unifies the specification of the call forwarding in mobile network and fixed network.

Based on the device and the method of the present disclosure, the video communication and the message communication can be forwarded together with the voice communication. That is, the terminal number of the terminal can establish voice communication with the set forwarding number, and at the same time, the terminal number of the terminal and the set forwarding number can establish the video communication and the message communication. The call forwarding performed by the IMS communication system effectively realizes the full-service call forwarding including voice forwarding, video forwarding and message forwarding, which ensures the safety of real-time communication in multiple scenarios, thereby greatly enhancing the communication efficiency.

The above embodiments are only preferred embodiments of the present disclosure, and are not intended to limit the scope of the present disclosure. Any modifications and changes made by those skilled in the art based on the spirit of the present disclosure shall fall within the scope of the present disclosure.

What is claimed is:

1. A call forwarding device based on an Internet Protocol (IP) multimedia subsystem (IMS), comprising:
    a terminal; and
    an IMS communication system connected to the terminal;
    wherein the IMS communication system is respectively connected to an IMS special service number device, an IMS user database and an IMS maintenance device;
    the terminal communicates with the IMS communication system through a wired network or a wireless network; after the terminal establishes a communication with the IMS special service number device, a forwarding condition and a forwarding number set through an IVR, and a calling number and a called number of the terminal are saved in the IMS user database;
    the IMS communication system allocates Session Initiation Protocol (SIP) accounts for the terminal, and a communication is established among the SIP accounts; wherein the SIP accounts comprise a calling number and a called number of the terminal, and a forwarding number set by the called number;
    when the calling number of the terminal dials the called number, the communication system of the IMS detects a status of the called number, and a communication is established between the calling number and the forwarding number of the terminal according to the forwarding condition set by the called number; wherein the communication comprises a voice communication, a video communication and a message communication, so that the video communication and the message communication are forwarded together with the voice communication;
    the terminal comprises an Internet Protocol (IP) videophone, an electronic device installed with an SIP client, and an Integrated Access Device (IAD) adaptable to a digital phone; and the IP videophone, the electronic device and the IAD are connected to the IMS communication system through the wired network; and
    the terminal further comprises a Voice over Long-Term Evolution (VoLTE)/Voice over New Radio (VoNR) mobile terminal and an electronic device installed with the SIP client; and the VoLTE/VoNR mobile terminal and the electronic device are connected to the IMS communication system through the wireless network,
    wherein when the wired network fails, the IMS communication system detects that the called number is offline, and the call forwarding is activated, the calling number of the terminal establishes the communication with the forwarding number, and when the wired network is restored, the offline call forwarding is automatically disabled.

2. The call forwarding device of claim 1, wherein the IP videophone, the electronic device installed with the SIP client, and the IAD are respectively connected to the wired network through an IP network.

3. A method for call forwarding using the call forwarding device of claim 1, comprising:
    1) dialing a special service number through the terminal to allow the terminal to communicate with the IMS special service number device; and broadcasting a voice navigation prompt for setting call forwarding;
    2) based on the voice navigation prompt, performing settings or cancellation of the call forwarding through DTMF on the terminal;
    3) saving the settings of the call forwarding in the IMS user database to make them effective;
    4) allocating the SIP accounts to the terminal connected to the IMS communication system, and establishing a communication among the SIP accounts of the terminal; wherein the SIP accounts of the terminal comprise the calling number and the called number of the terminal and the forwarding number set by the terminal; and
    5) when a user dials the called number through the calling number of the terminal, allowing the IMS communication system to detect a status of the called number, and establishing a communication between the calling number of the terminal and the forwarding number according to the forwarding condition and the forwarding number set by the called number; wherein the communication comprises a voice communication, a video communication and the message communication.

4. The method of claim 3, wherein the settings of the call forwarding comprise offline call forwarding, busy call forwarding, unanswered call forwarding, unconditional call forwarding, ringing duration for unanswered call forwarding, time for unconditional call forwarding, and querying of the status of the called number.

5. The method of claim 3, wherein when the IMS communication system detects that the called number is online, and the call forwarding is activated, the calling number of the terminal establishes the communication with the forwarding number.

6. The method of claim 3, wherein when the IMS communication system detects that the called number is online, and the call forwarding is not activated, the calling number of the terminal establishes the communication with the called number.

* * * * *